(12) United States Patent
Fujiwara

(10) Patent No.: US 8,010,580 B2
(45) Date of Patent: Aug. 30, 2011

(54) INFORMATION BROWSER, METHOD OF CONTROLLING SAME, AND PROGRAM

(75) Inventor: Masato Fujiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 542 days.

(21) Appl. No.: 11/775,153

(22) Filed: Jul. 9, 2007

(65) Prior Publication Data

US 2008/0021929 A1 Jan. 24, 2008

(30) Foreign Application Priority Data

Jul. 18, 2006 (JP) .................................. 2006-196003

(51) Int. Cl.
*G06F 17/30* (2006.01)
(52) U.S. Cl. ........ 707/805; 707/706; 707/713; 707/722; 707/736; 707/758; 707/781; 707/891; 707/802; 707/803; 707/809; 386/83; 345/169; 711/5; 725/61; 725/88; 725/89
(58) Field of Classification Search .................. 707/102, 707/706, 713, 722, 736, 758, 781, 791, 802, 707/803, 805, 809, 999.1, 999.101, 999.102, 707/999.103, 999.107; 386/83; 345/169; 711/5; 725/61, 89, 88
See application file for complete search history.

(56) References Cited

U.S. PATENT DOCUMENTS

| | | | | |
|---|---|---|---|---|
| 6,065,058 A * | 5/2000 | Hailpern et al. | ............. | 709/231 |
| 6,833,848 B1 * | 12/2004 | Wolff et al. | .................. | 715/719 |
| 2002/0178232 A1 * | 11/2002 | Ferguson | ..................... | 709/217 |
| 2003/0187744 A1 * | 10/2003 | Goodridge, Jr. | ................ | 705/26 |
| 2004/0249650 A1 * | 12/2004 | Freedman et al. | ................. | 705/1 |
| 2005/0180728 A1 * | 8/2005 | Ichioka et al. | .................. | 386/46 |
| 2006/0055826 A1 * | 3/2006 | Zimmermann et al. | ...... | 348/625 |
| 2006/0215984 A1 * | 9/2006 | Nesvadba et al. | ............... | 386/46 |
| 2007/0136231 A1 * | 6/2007 | Padmanabhan | ................... | 707/2 |
| 2007/0147775 A1 * | 6/2007 | Harradine et al. | .............. | 386/83 |
| 2007/0223443 A1 * | 9/2007 | Wang et al. | .................... | 370/349 |

FOREIGN PATENT DOCUMENTS

| | | | |
|---|---|---|---|
| JP | 2000-305836 A | | 11/2000 |
| JP | 2002-251315 A | | 9/2002 |
| JP | 2004-280405 A | | 10/2004 |
| JP | 2005-085174 A | | 3/2005 |

OTHER PUBLICATIONS

"Digital Living Network Alliance", [online], [retrieved on Jul. 12, 2006], the Internet <http://www.dlna.org/about/ DLNA_Overview.pdf>.

* cited by examiner

*Primary Examiner* — Syling Yen
(74) *Attorney, Agent, or Firm* — Canon U.S.A., Inc. I.P. Division

(57) ABSTRACT

A meta-information-read unit, a display-cache unit, a pre-reading-cache unit, a display-state-management unit, an operation-input unit, a meta-information-pre-reading unit, and an input-operation-determination unit are provided. The meta-information-pre-reading unit changes a pre-reading condition and pre-reads meta information on the basis of a result of determination made by the input-operation-determination unit and display-state-management information managed by the display-state-management unit.

8 Claims, 6 Drawing Sheets

FIG. 6
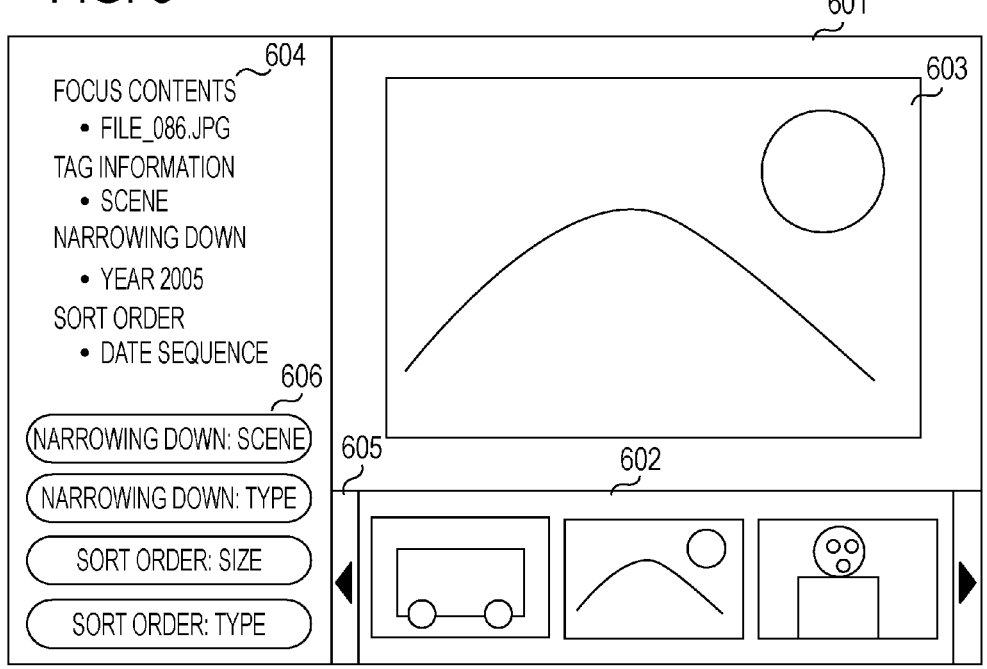
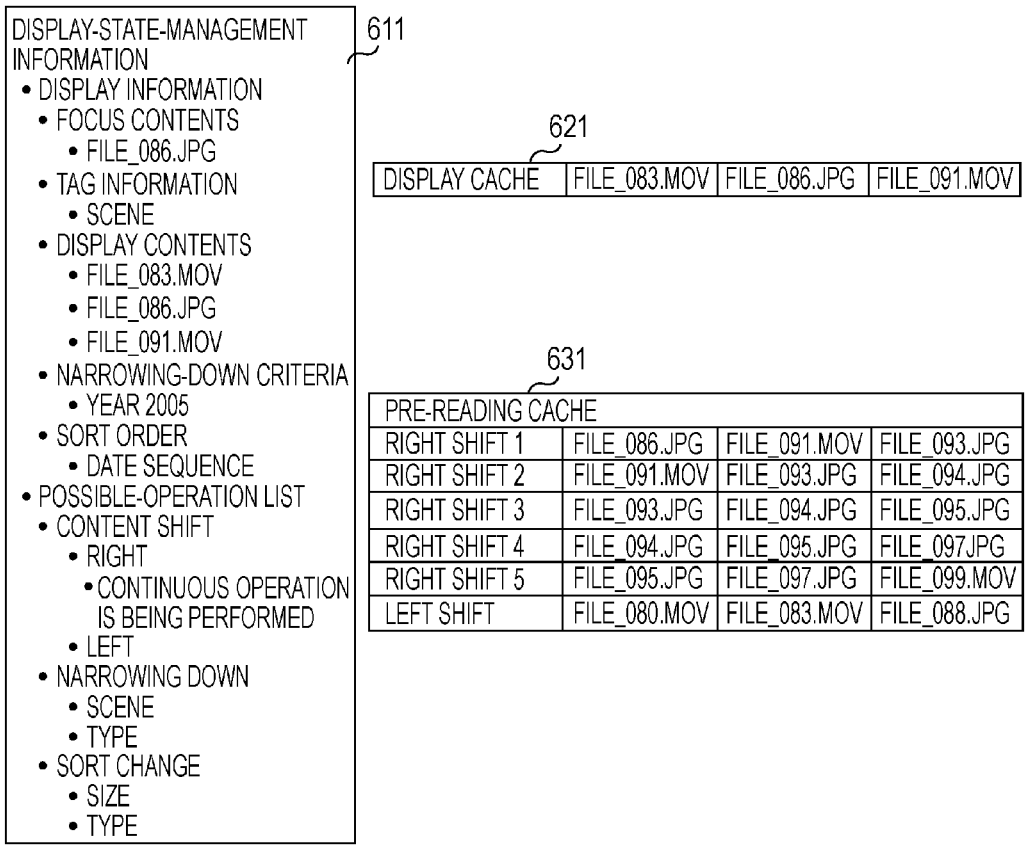

INFORMATION BROWSER, METHOD OF CONTROLLING SAME, AND PROGRAM

BACKGROUND OF THE INVENTION

1. Field of the Invention

The present invention relates to an information browser and particularly relates to an information browser configured to pre-read meta information and a method of pre-reading information.

2. Description of the Related Art

In recent years, many digital-versatile-disk (DVD) recorders including a hard-disk drive and many devices configured to accumulate digital-video contents so that a user can browse the digital-video contents that are available. The main function of the DVD recorder is to digitally record a television broadcast so that the user can view the television broadcast. Additionally, private contents obtained through a digital-still camera, a digital-video camera, and so forth can be accumulated on the DVD recorder so that the user can browse the private contents.

Further, systems configured to uniquely manage contents accumulated on a plurality of digital-video-content servers including a digital-living-network alliance (DLNA), a media server, and so forth so that a user can browse the accumulated contents have become rapidly available. Each of the above-described systems is configured to transfer digital-video contents accumulated by using a local-area-network (LAN) environment constructed in a household and decode the digital-video contents in real time so that the user can view the digital-video contents (for example, refer to "Digital Living Network Alliance", [online], [retrieved on Jul. 12, 2006], the Internet <http://www.dlna.org/about/DLNA_Overview-.pdf>). When another content server is added to the system, the user can easily handle an increased number of accumulated contents. Further, the user can search for and/or view all of the contents without minding the server storing the contents.

Usually, for generating a screen image used for retrieving contents, each of the above-described systems collects meta-data items relating to all of the accumulated contents from all of the content servers, and generates the content-retrieval-screen image after the meta-data items are obtained.

According to the above-described method, however, considerable time is consumed to generate an initial screen image, due to an increased number of contents. Moreover, the memory resource in a display apparatus may become insufficient. For avoiding the above-described problems, a method of collecting only meta data relating to contents necessary for display may be considered. According to the above-described method, however, the meta data necessary for display is collected each time the display state changes. In that case, latency time occurs before the next screen image is displayed, which makes it difficult for the user to perform a retrieval operation comfortably.

On the other hand, in the case where an Internet browser is used, home-page data generated by using Hypertext Markup Language (HTML) or the like is downloaded to a browser terminal, and the home-page data is displayed. In the past, in the case where the Internet browser is used, a user specifies a link destination by using a mouse or the like and starts downloading home-page data obtained at the link destination. Therefore, even though an interactive operation is performed, the user has to wait until the downloading is finished. For avoiding the above-described problem, there have been proposed various technologies for pre-reading the home-page data obtained at the link destination and an application program necessary to display the home-page data before the link destination is specified.

Further, there has been proposed a technology for determining whether or not information about the link destination, the information being subjected to pre-reading, had already been downloaded, and pre-reading only information that had not been downloaded so that the pre-reading efficiency is increased. The above-described technology is disclosed in Japanese Patent Laid-Open No. 2000-305836, for example.

Further, there has been proposed a technology for managing the access log of a user, analyzing the access log, and downloading information about a link destination according to the inclination and access pattern of the user so that downloading of unnecessary information is reduced and the pre-reading efficiency is increased. The above-described technology is disclosed in Japanese Patent Laid-Open No. 2004-280405, for example.

There has been proposed a technology for monitoring the position of a mouse cursor, predicting an operation performed by a user, and assigning priority to information for pre-reading so that the pre-reading efficiency is increased. The above-described technology is disclosed in Japanese Patent Laid-Open No. 2002-251315 and Japanese Patent Laid-Open No. 2005-085174, for example.

However, the above-described technologies allow for pre-reading information about static link destinations arranged on the Internet in a two-dimensional manner. Therefore, the above-described technologies only allow for pre-reading the link-destination information imbedded in displayed information generated by using HTML or the like. Further, a continuous same operation is not considered in the above-described technologies. Therefore, when information about images or the like is viewed through slideshow with high speed, pre-reading operations lag behind display operations performed to achieve the slideshow, which makes it difficult for a user to browse through the information comfortably.

SUMMARY OF THE INVENTION

An embodiment of the present invention provides an information browser, a method of controlling the information browser, and a program that can solve or at least mitigate the above-described problems and allow a user to perform browsing comfortably even though a continuous input operation is performed.

According to an aspect of the present invention, an information browser according to an embodiment includes a meta-information-read unit configured to read meta information, a display-storage unit configured to store first image information read by the meta-information-read unit, a display unit configured to generate a display-screen image by using the first image information stored by the display-storage unit, a display-state-management unit configured to manage a state of the display-screen image generated by the display unit, an image-information-pre-reading unit configured to pre-read second image information by using the meta-information-read unit based on display-state-management information managed by the display-state-management unit, and a pre-reading-storage unit configured to store the second image information pre-read by the image-information-pre-reading unit.

According to another aspect of the present invention, the condition of content-meta information for pre-reading is dynamically changed according to the state of the input operation so that a user can browse the content-meta information comfortably even though the continuous input operation is performed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows a screen image displayed on a display monitor and display-state-management information according to the second embodiment.

DESCRIPTION OF THE EMBODIMENTS

Hereinafter, preferred embodiments of the present invention will now be described in detail in accordance with the accompanying drawings. It is to be understood that the following embodiments do not limit the scope of the appended claims, and not all combinations of features described in the following embodiments may be required to achieve the present invention.

First Embodiment

Figure 1:
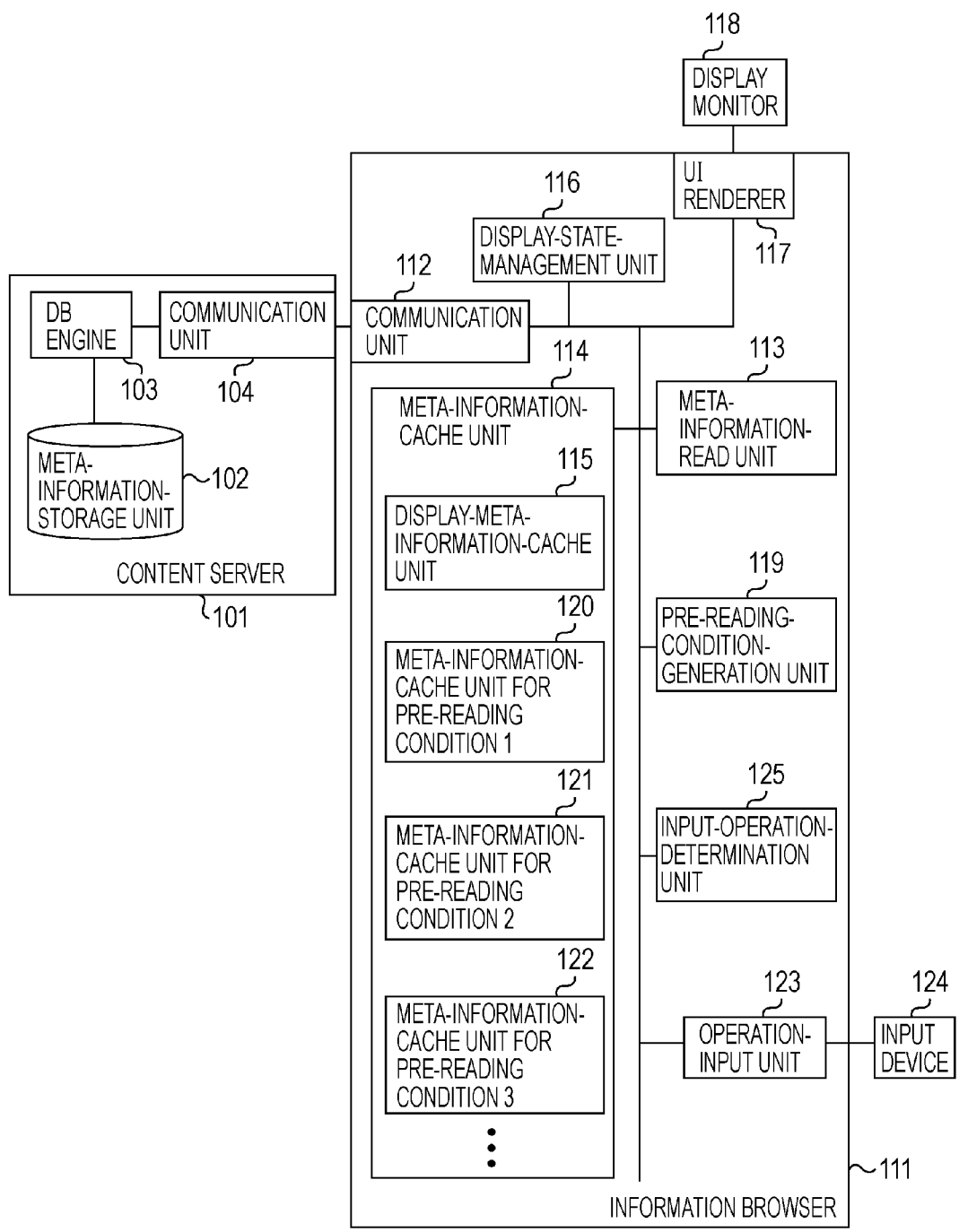
FIG. 1 shows the configuration of an embodiment of the present invention.

Hereinafter, a first embodiment of the present invention will be described with reference to the attached drawings. FIG. 1 shows an example configuration of an information browser and an information-browsing system according to the first embodiment. A content server 101 is provided, so as to accumulate digital contents. The content server 101 functions, as a storage server accumulating not only video contents including video and/or a still image, but also an office document typified by a document file. A meta-information-storage unit 102 is provided, so as to accumulate meta information relating to the accumulated contents, and a database engine 103 is provided, so as to manage, record, and read the meta information stored in the meta-information-storage unit 102.

Further, an information browser 111 according to the first embodiment is provided, so as to display a screen image used for retrieve the contents accumulated on the content server 101 and/or reproduce and display the contents. A communication unit 112 is provided, so as to transmit and/or receive a command, the meta information, and the content data between the communication unit 112 and the content server 101. In the first embodiment, the content server 101 and the information browser 111 are described, as separate devices connected to each other via the communication unit 112. However, the meta-information-storage unit 102 and the database engine 103 may be integrated into the information browser 111.

A meta-information-read unit 113 generates and transmits a command to the content server 101 via the communication unit 112, so as to make a request to read the meta information. A meta-information-cache unit 114 functioning as a meta-information-storage unit is provided, so as to cache or store the read meta information. A display-cache unit 115 functioning, as a display-storage unit, is provided, so as to cache meta information used for actual display. A display-state-management unit 116 is provided, so as to manage the display state in synchronization with the display-cache unit 115.

A user-interface (UI) renderer 117 functioning, as a display unit, is provided, so as to generate a graphical user interface (GUI) functioning, as a display-screen image, on the basis of the meta information stored in the display-cache unit 115 and management information managed by the display-state-management unit 116. A display monitor 118 functioning, as a display device, is provided, so as to display the display-screen image generated by the UI renderer 117.

A pre-reading-condition-generation unit 119 is provided, so as to generate pre-reading conditions on the basis of the display-state-management information managed by the display-state-management unit 116. Pre-reading-cache units 120, 121, and 122 functioning, as pre-reading-storage units, are provided, so as to cache pre-read meta information for each of the pre-reading conditions. Further, an operation-input unit 123, an input device 124, and an input-operation-determination unit 125 are provided, where the input-operation-determination unit 125 determines details on an input operation. Here, the meta information may include data on a thumbnail image of contents other than information about the content name, the content type, the date of creation, the content size, and so forth.

Figure 2:
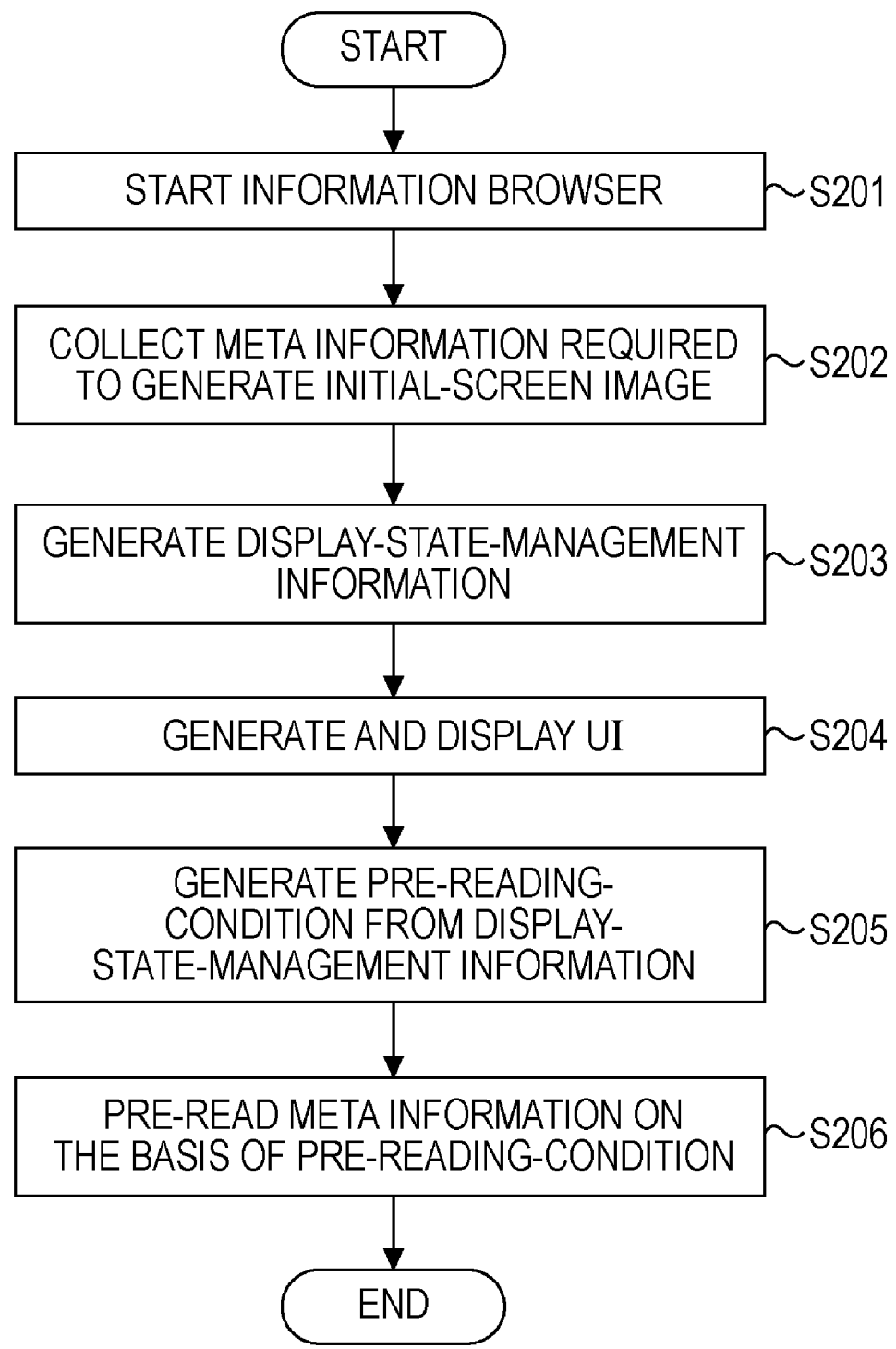
FIG. 2 is a flowchart showing processing procedures performed to pre-read meta information according to a first embodiment of the present invention.
Figure 4:
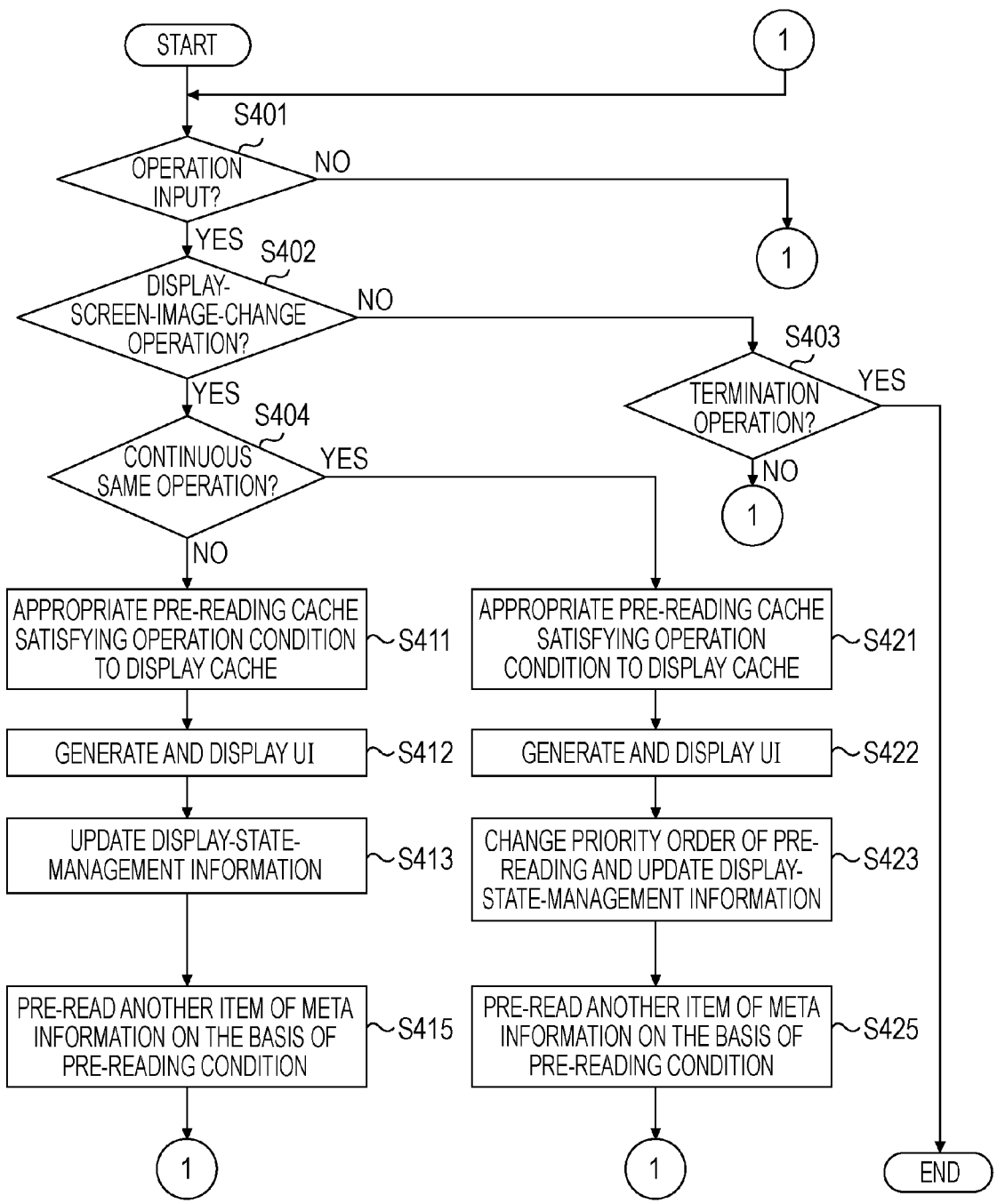
FIG. 4 is a flowchart showing processing procedures performed to pre-read the meta information, when an input operation is performed, according to the first embodiment.

Each of FIGS. 2 and 4 shows a flowchart illustrating operations performed by the information browser 111 according to the first embodiment. The flowchart shown in FIG. 2 illustrates processing procedures performed from when the information browser 111 is started to when pre-reading of the meta information is finished. First, when the information browser 111 is started, at step S201, meta information required to generate an initial-screen image is collected and stored in the display-cache unit 115, at step S202.

Then, the display-state-management unit 116 that had collected the meta information generates display-state-management information, at step S203. The display-state-management information includes information about displayed contents, and particularly includes information such as content identification (ID) provided, so as to uniquely identify contents, and information about an input operation performed on a displayed screen image, which changes the displayed screen image. Concurrently with the generation of the display-state-management information, the UI renderer 117 generates a user interface by using the meta information cached in the display-cache unit 114, and displays the generated user interface on the image screen of the display monitor 118, at step S204. Further, the pre-reading-condition-generation unit 119 generates the pre-reading conditions on the basis of the display-state-management information, at step S205. Then, the meta information is pre-read through the meta-information-read unit 113 on the basis of the above-described pre-read conditions and the pre-read meta information is stored in at least one of the pre-reading-cache units 120 to 122 on a condition-by-condition basis, at step S206.

Here, the pre-reading condition is the condition corresponding to the input operation, which changes the displayed screen image, where the input-operation information is included in the display-state-management information. Namely, the pre-reading condition is required to collect meta information necessary to change the sort order and/or narrow down contents, for example.

Figure 3:
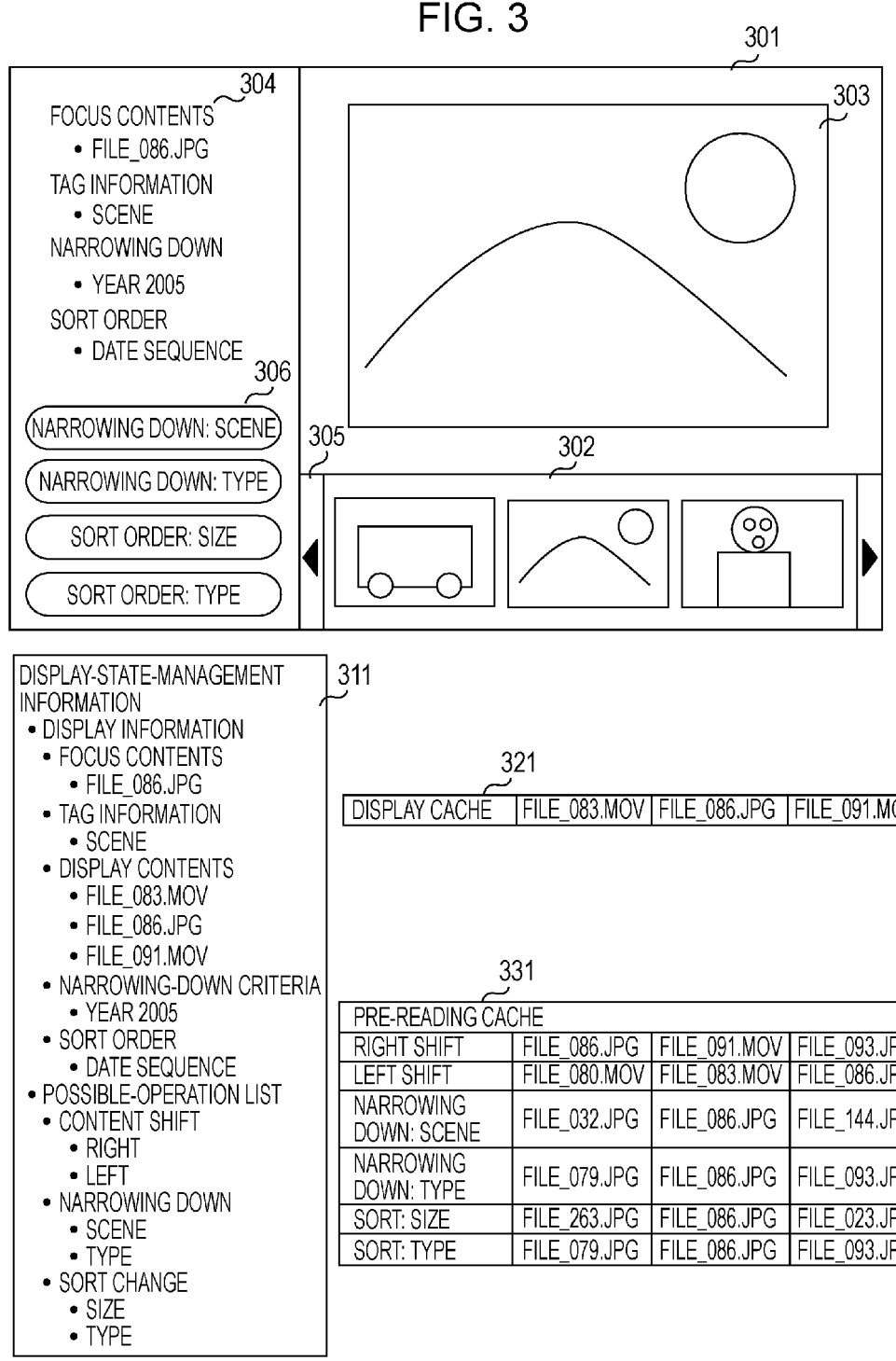
FIG. 3 shows a screen image displayed on a display monitor and display-state-management information according to the first embodiment.

FIG. 3 shows a screen image displayed on the display monitor 118, the display-state-management information, and a simplified diagram of the relationship between a display cache and a pre-reading cache. FIG. 3 shows an example display-screen image 301 displayed on the display monitor 118. Hereinafter, the display-screen image 301 will be described, as a widely used film-strip-screen image. However, details on the display-screen image 301 may not be limited to those on the film-strip-screen image.

A group of thumbnails 302 shows part of the content list, and contents 303 are shown in a size larger than those of the thumbnails, which means that the contents 303 come into focus. Property information 304 shows the property of displayed contents. The property information includes information about the file name of the contents that come into focus, and the tag of the contents, for example. Further, the property information includes information about a narrow-down condition, a sort condition, and so forth, as information about the display state. However, details on the property information are not limited to those shown in the first embodiment.

When each of operations 305 and 306 is performed, details on the displayed screen image are changed. Although all of the operations are shown in FIG. 3 for the sake of description, another method may be used, so as to display the operations. For example, if a left-shift button 305 used for achieving the left-shift operation is selected, the thumbnail group 302 is shifted to the left and another thumbnail appears from the right. Further, if a button "sort order: type" used for achieving the operation 306 is selected, the sort order is changed centering on the image which comes into focus, and thumbnails arranged on both sides of the thumbnail that comes into focus are changed.

Display-state-management information 311 is provided, as example display-state-management information. The display-state-management information 311 includes currently displayed information and operation information that can be input at present by performing an input operation. In the field of a display cache 321 shown in FIG. 3, details on meta-information items are omitted. The meta-information items are shown in groups and each of the groups is indicated by a file name. In the field of a pre-reading cache 331, details on meta-information items are omitted, as is the case with the display cache 321. However, pre-read content-meta information is stored in the pre-reading cache 331 for each of operations written in the display-state-management information, that is, input operations that can be performed. In this specification, a method of acquiring overlapping meta-information items of the content-meta information stored in the display cache 321 and the pre-reading cache 331 will not be described.

FIG. 4 is a flowchart illustrating processing procedures performed from when an input operation is performed (i.e., when information about the input operation is transmitted to the information browser 111) to when content-meta information is pre-read in response to the input operation, according to the first embodiment. First, the process waits for an operation input at step S401. When the information about the input operation is received (at step S401) and no change occurs in a displayed screen image (at step S402), and if it is determined that an input operation to terminate the processing is received at step S403, terminate processing is performed to terminate the processing procedures. The cached meta information may be retained, or the contents of the cache may be abandoned during the terminate processing. However, if the cached meta information is retained, a screen image can be displayed without delay when the information browser 111 is started next time.

If a change occurs in the displayed screen image due to the input operation, at step S402, an input-operation-determination unit 125 determines whether or not information about a continuous same operation is input, at step S404. The continuous same operation denotes a case where the same key is pressed down over a predetermined time period, that is, for example, where a button of a remote-control key is continuously pressed down over a defined time period and/or a case where the same key is repeatedly pressed down at least a defined number of times within a defined time period.

If it is determined that the continuous-same operation is not performed, at step S404, a pre-reading cache satisfying an operation condition is appropriated to a display cache. The display cache that had been used by then is used, as a cache used for performing the next pre-reading, at step S411. In that case, however, the display cache is dynamically appropriated to the pre-reading cache. However, the display cache may be fixed and contents of the pre-reading cache may be copied to the display cache.

When the meta information is prepared in another display cache, the UI renderer 117 generates and displays a user interface, at step S412. At the same time, the display-state-management information is updated, at step S413, and the meta information is pre-read on the pre-reading condition, at step S415.

If it is determined that the continuous-same operation is performed, at step S404, the pre-reading cache satisfying the operation condition is appropriated to the display cache, and the display cache that had been used by then is used, as a cache used for performing the next pre-reading, at step S421, as is the case where the continuous-same operation is not performed.

Next, when the meta information is prepared in another display cache, the UI renderer 117 generates and displays a user interface, at step S422. At the same time, the display-state-management information is updated, at step S423.

Here, when the continuous same operation is performed, another operation is performed instantaneously on rare occasion. Usually, a user stops performing an operation, confirm a still-image screen, and performs the next operation. Therefore, compared to pre-reading processing performed for executing another operation, pre-reading processing is assigned higher priority and performed, so as to perform the continuous same input operation, so that the load of performing unnecessary pre-reading can be reduced. Therefore, the priority of the pre-reading processing is changed, at step S423, and the meta information is pre-read on the pre-reading condition, at step 425.

By performing the above-described processing procedures, an information browser and a pre-reading method that allow the user to perform browsing comfortably during the continuous input operation can be provided. Further, an interactive user interface can be achieved with a fast response while saving memory.

Second Embodiment

Hereinafter, a second embodiment of the present invention will be described with reference to the attached drawings.

Figure 5:
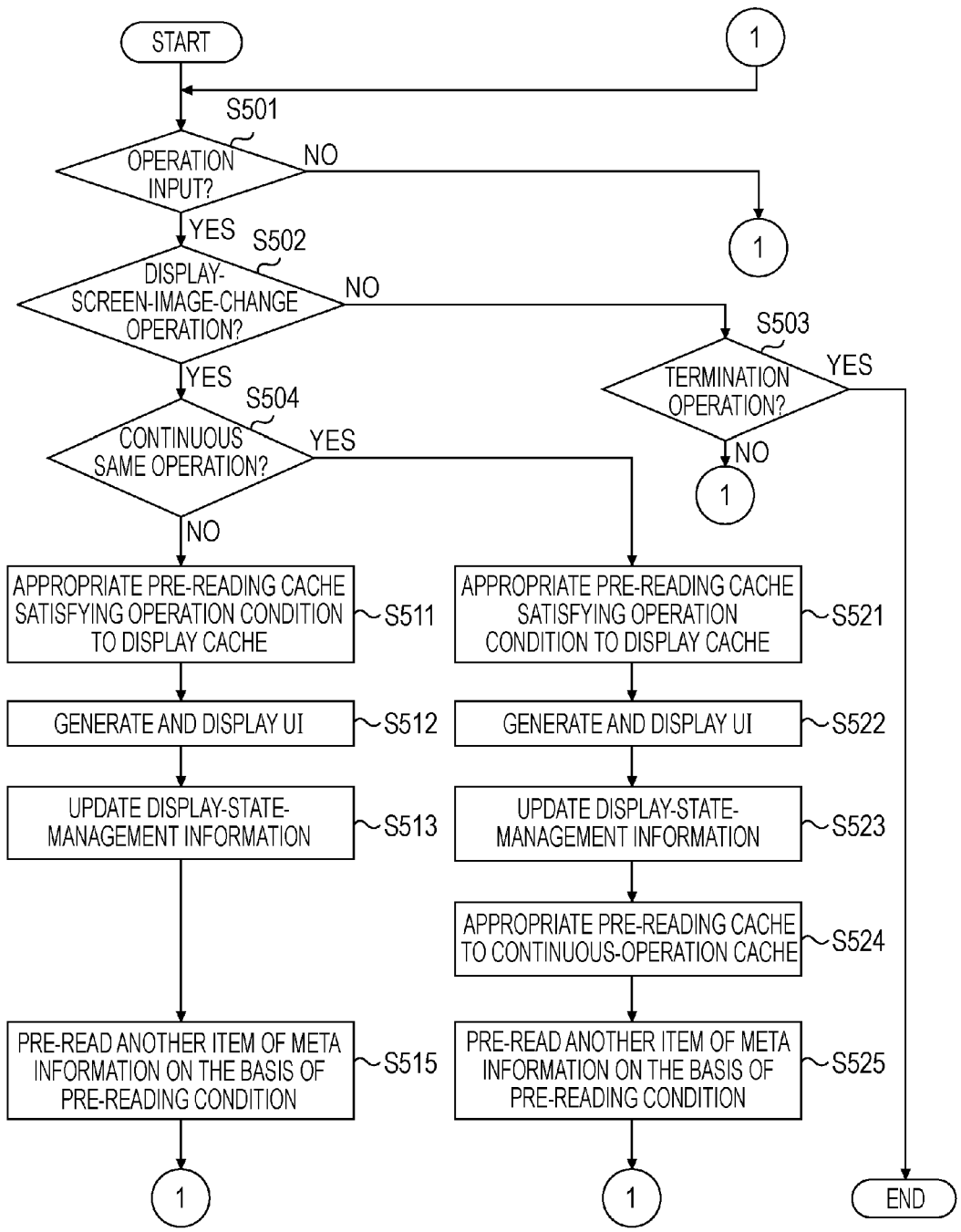
FIG. 5 is a flowchart showing processing procedures performed to pre-read the meta information, when an input operation is performed, according to a second embodiment of the present invention.

Here, the same or similar components or functional units as those used in the first embodiment will not be described. FIG. 5 is a flowchart illustrating processing procedures performed from when an input operation is performed (i.e., when information about the input operation is transmitted to an information browser) to when content-meta information is preread in response to the input operation, according to the second embodiment. The difference between the first and second embodiments relates to the processing procedures performed when it is determined that the continuous same operation is performed, at step S504.

If it is determined that the continuous same operation is performed, at step S504, a pre-reading cache satisfying the operation condition is appropriated to the display cache, and the display cache that had been used by then is used, as a cache used for performing the next pre-reading, at step S521. Next, when the meta information is prepared in another display cache, the UI renderer 117 generates and displays a user interface, at step S522. At the same time, the display-state-management information is updated, at step S523.

The above-described processing procedures are the same as those performed in the first embodiment. As has been described in the first embodiment, another operation can be performed instantaneously on rare occasion when the continuous same operation is performed. Therefore, a part of or the entire pre-reading cache used for performing another operation is appropriated to a pre-reading cache used for performing the continuous same operation so that the number of contents that can be cached is increased. Subsequently, transition from one display-screen image to another can be achieved with increased speed.

Then, the display-state-management information is updated, at step S523 and the pre-reading cache is appropriated to a cache used for performing the continuous operation, at step S524. Further, the meta information is pre-read on the pre-reading condition, at step S525.

FIG. 6 shows a screen image displayed on the display monitor 118, display-state-management information, and a simplified diagram of the relationship between a display cache and a pre-reading cache. In FIG. 6, details on an example display-screen image 601, a group of thumbnails 602, contents 603, property information 604, operations 605 and 606, display-state-management information 611, a display cache 621, and a pre-reading cache 631 are the same as those on the example display-screen image 301, the group of thumbnails 302, the contents 303, the property information 304, the operations 305 and 306, the display-state-management information 311, the display cache 321, and the pre-reading cache 331 that are shown in FIG. 3. According to the display-state-management information 611, a right-shift operation is continuously performed for the contents 603. The operation-input-determination unit 125 determines that the continuous-same operation is performed and information about the determination is reflected in the display-state-management information.

In the pre-reading cache, if the continuous operation inputs are not transmitted, the pre-reading cache is appropriated to each of possible operations, and the meta information is preread. If the continuous operation inputs are transmitted, part of the above-described caches is appropriated to a pre-reading cache used for performing a right-shift operation, so as to be ready for the continuous operation. Further, according to FIG. 6, a pre-reading cache used for performing a left-shift operation is left. According to the above-described configuration, even though target contents slip away due to overrun, the user can return to the target contents immediately. Here, since information stored in the left-shift-pre-reading cache is the same as the next previous information stored in the display cache, further pre-reading may not be performed.

Further, the number of caches to be appropriated may be adjusted on the basis of the line status of the communication unit 112 and/or the time intervals at which the continuous-same operation is received so that information about the continuous-same operation is reflected in the processing procedures. Subsequently, the number of meta-information items relating to contents for pre-reading can be changed.

Further, not all items of the meta information are necessary while the same operation is performed continuously. According to the configuration shown in FIG. 6, for example, only information about the thumbnails, names, and dates of contents is required, as the meta information. When the continuous-same operation is performed, unnecessary traffic can be reduced by dynamically changing a meta-information item for pre-reading to another.

By performing the above-described processing procedures, an information browser and a pre-reading method allowing the user to perform browsing comfortably during the continuous input operation can be provided. Subsequently, an interactive user interface can be achieved with a fast response while saving memory.

Each of the units included in the information browser according to each of the first and second embodiments of the present invention, and each of the steps performed according to the method of controlling the information browser according to each of the first and second embodiments can be achieved through operations performed by a program stored in a random-access memory (RAM), a read-only memory (ROM), and so forth of a computer. The above-described program and a computer-readable recording medium storing the program also constitute the present invention.

According to another embodiment of the present invention, the configurations and/or functions of the above-described embodiments can be achieved by using a system, an apparatus, a method, a program, a recording medium, and so forth. More specifically, the configurations and/or functions of the above-described embodiments can be achieved by using a single apparatus.

Further, the present invention can also be achieved by supplying program code of software achieving the functions of the above-described embodiments to a system and/or an apparatus directly and/or from a remote location. Then, a computer of the system and/or the apparatus reads and executes the supplied program code so that the functions of the above-described embodiments are achieved.

Therefore, the program code itself installed in the above-described computer, so as to achieve the functional processing of the present invention, also achieves the present invention. Namely, a computer program executing functional processing of the present invention can also constitute the present invention. In that case, the computer program may be object code, a program executed by an interpreter, script data supplied to an operating system (OS), and so forth, as long as it has the program function.

Further, the functions of the above-described embodiments can be achieved not only by a computer executing the read program, but also by an OS or the like running on the computer and executing part of or the entire actual processing on the basis of instructions of the program.

In another embodiment of the present invention, the program read from the storage medium may be written into a memory provided in a function expansion board inserted in the computer and/or a function expansion unit connected to the computer. The part of or the entire actual processing may be executed by a central-processing unit (CPU) or the like provided in the function expansion board and/or the function expansion unit on the basis of instructions of the program so that the functions of the above-described embodiments are achieved.

Other Embodiments

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-196003 filed on Jul. 18, 2006, which is hereby incorporated by reference herein in its entirety.

What is claimed is:

1. An information browser comprising:
a communication unit configured to receive meta information relating to contents from a content server;
a meta-information-read unit configured to read meta information received by the communication unit;
a display-storage unit configured to store first meta information read by the meta-information-read unit in order to display contents corresponding to the first meta information;
a display unit configured to generate a display-screen image using the first meta information stored by the display-storage unit;
a display-state-management unit configured to manage a state of the display-screen image generated by the display unit;
a meta-information-pre-reading unit configured to pre-read meta information using the meta-information-read unit for each of a plurality of input operations, based on information about the input operations that change the display screen-image, included in display-state-management information managed by the display-state-management unit;
a first pre-reading-storage unit configured to store meta information corresponding to a first input operation out of the meta information pre-read by the meta-information-pre-reading unit;
a second pre-reading-storage unit configured to store meta information corresponding to a second input operation different from the first input operation out of the meta information pre-read by the meta-information-pre-reading unit;
an operation-input unit; and
an input-operation-determination unit configured to determine whether the operation-input unit performs a same input operation continuously,
wherein, when the input-operation-determination unit determines that the first input operation is continuously performed, the second pre-reading-storage unit is appropriated to store the meta information corresponding to the first input operation, and the meta-information-pre-reading unit assigns priority to the meta information corresponding to the first input operation over the meta information corresponding to the second input operation, pre-reads the meta information corresponding to the first input operation, and the second pre-reading-storage unit stores the meta information corresponding to the first input operation.

2. The information browser according to claim 1, wherein the meta-information-pre-reading unit changes a pre-reading condition based on the display-state-management information and a result of the determination made by the input-operation-determination unit.

3. The information browser according to claim 1 wherein the display-state-management information includes uniquely identifying contents displayed by the display unit.

4. The information browser according to claim 1, wherein when the input-operation-determination unit determines that the continuous first input operation is performed, an amount of meta information read by the meta-information-pre-reading unit is changed.

5. The information browser according to claim 1 wherein when the input-operation-determination unit determines that the continuous first input operation is performed, an item of meta information read by the meta-information-pre-reading unit is changed.

6. The information browser according to claim 4, wherein when the continuous first input operation is performed, an amount of meta information read by the meta-information-pre-reading unit is changed on the basis of the communication status of the communication unit.

7. A method comprising:
a receiving step of receiving meta information relating to contents from a content server;
a reading step of reading meta information received in the receiving step;
a first storing step of storing first meta information read in the reading step in order to display contents corresponding to the first meta information;
a generating step of generating a display-screen image by using the stored first meta information stored in the first storing step;
a managing step of managing a state of the display-screen image generated in the generating step;
a pre-reading step of pre-reading second meta information for each of a plurality of input operations, based on information about the input operations that change the display-screen image, included in display-state-management information;
a second storing step of storing meta information corresponding to a first input operation out of the meta information pre-read by the pre-reading step;
a third storing step of storing meta information corresponding to a second input operation different from the first input operation out of the meta information pre-read by the pre-reading step; and
a determining step of determining whether an operation-input unit performs a same input operation continuously,
wherein, when the determining step determines that the first input operation is continuously performed, the third storing step stores the meta information corresponding to the first input operation, and the pre-reading step assigns priority to the meta information corresponding to the first input operation over the meta information corresponding to the second input operation, pre-reads the meta information corresponding to the first input operation, and the third storing step stores the meta information corresponding to the first input operation.

8. A computer-readable storage medium having computer-executable instructions thereon for causing a computer to perform a method comprising:

a receiving step of receiving meta information relating to contents from a content server;

a reading step of reading meta information received in the receiving step;

a first storing step of storing first meta information read in the reading step in order to display contents corresponding to the first meta information;

a generating step of generating a display-screen image by using the stored first meta information stored in the first storing step;

a managing step of managing a state of the display-screen image generated in the generating step;

a pre-reading step of pre-reading second meta information for each of a plurality of input operations, based on information about the input operations that change the display-screen image, included in display-state-management information;

a second storing step of storing meta information corresponding to a first input operation out of the meta information pre-read by the pre-reading step;

a third storing step of storing meta information corresponding to a second input operation different from the first input operation out of the meta information pre-read by the pre-reading step; and a determining step of determining whether an operation-input unit performs a same input operation continuously, wherein, when the determining step determines that the first input operation is continuously performed, the third storing step stores the meta information corresponding to the first input operation, and the pre-reading step assigns priority to the meta information corresponding to the first input operation over the meta information corresponding to the second input operation, pre-reads the meta information corresponding to the first input operation, and the third storing step stores the meta information corresponding to the first input operation.

* * * * *